(12) United States Patent
Wei et al.

(10) Patent No.: US 11,900,680 B2
(45) Date of Patent: Feb. 13, 2024

(54) EXTRACTING CLIPS OF APPLICATION USE FROM RECORDINGS OF SESSIONS

(71) Applicant: Citrix Systems, Inc., Fort Lauderdale, FL (US)

(72) Inventors: Daowen Wei, Nanjing (CN); Hengbo Wang, Nanjing (CN); Jian Ding, Nanjing (CN); Feng Tao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 58 days.

(21) Appl. No.: 17/742,057

(22) Filed: May 11, 2022

(65) Prior Publication Data

US 2023/0326210 A1   Oct. 12, 2023

Related U.S. Application Data

(63) Continuation of application No. PCT/CN2022/086062, filed on Apr. 11, 2022.

(51) Int. Cl.
*G06V 20/40* (2022.01)
*G06F 11/34* (2006.01)
*G06F 11/30* (2006.01)
*G06F 9/455* (2018.01)

(52) U.S. Cl.
CPC .......... *G06V 20/46* (2022.01); *G06F 9/45558* (2013.01); *G06F 11/3006* (2013.01); *G06F 11/3438* (2013.01); *G06V 20/44* (2022.01); G06F 2009/45595 (2013.01)

(58) Field of Classification Search
CPC .... G06V 20/46; G06V 20/44; G06F 9/45558; G06F 11/3006; G06F 11/3438; G06F 2009/45595
See application file for complete search history.

(56) References Cited

U.S. PATENT DOCUMENTS

| | | | |
|---|---|---|---|
| 11,106,524 B1* | 8/2021 | Csabi | G06N 3/08 |
| 2012/0023437 A1* | 1/2012 | Moriwaki | G06F 3/1423 715/781 |
| 2014/0075371 A1* | 3/2014 | Carmi | G06F 9/451 715/781 |
| 2015/0378561 A1* | 12/2015 | Ollinger | G06Q 30/016 707/769 |
| 2021/0064397 A1* | 3/2021 | Tokudome | G06F 16/148 |
| 2021/0314655 A1* | 10/2021 | Butler | H04N 21/8545 |
| 2022/0100639 A1* | 3/2022 | Weishaar | G06F 11/3692 |
| 2022/0400157 A1* | 12/2022 | Martin | G06Q 30/02 |
| 2023/0214239 A1* | 7/2023 | Singh | G06N 3/0464 715/704 |

* cited by examiner

Primary Examiner — David E Choi

(57) ABSTRACT

Described embodiments provide systems and methods for defining a clip within a recording. A device may generate a recording of a session of a user via which a plurality of applications is accessible. The device may detect a transition of an application of the plurality of applications in a foreground of the session. The device may identify, from the recording, a frame corresponding to the transition in the foreground. The device may store an identification of the frame corresponding to the transition to define a clip of the user within the recording using the application in the session.

11 Claims, 15 Drawing Sheets

EXTRACTING CLIPS OF APPLICATION USE FROM RECORDINGS OF SESSIONS

CROSS-REFERENCE TO RELATED APPLICATION

This application is a continuation of and claims priority to International Application No. PCT/CN2022/086062, titled "EXTRACTING CLIPS OF APPLICATION USE FROM RECORDING SESSIONS," and filed on Apr. 11, 2022, the contents of all of which are hereby incorporated herein by reference in its entirety for all purposes.

FIELD OF THE DISCLOSURE

The present application generally relates to communication sessions. In particular, the present application relates to systems and methods for defining a clip within a recording of a session.

BACKGROUND

A client may access resources for an application hosted on a server via a gateway. The gateway may support a session between the client and the server to facilitate the accessing of the resources by the client.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

A client may provide and present a desktop environment including a number of graphical user interface (GUI) elements through which a user can access a myriad of applications, files, and other functions of an operating system. The desktop environment may be native to the client or may be provided via desktop virtualization in a session supported by a gateway. Through the session, the gateway may host a virtual machine to provide a virtualized desktop environment to provide the client access to resources for applications hosted on a myriad of servers. In both the native and virtual settings, the user can use an input/output (I/O) device of the client to interact with GUI elements in the desktop environment to open applications. With one or more applications open within the desktop environment, the user may continue to interact with the GUI elements to access various functionalities provided by the applications.

A recording service may capture on-screen activities of the user interacting with the application within the desktop environment or the environment itself for various reasons, such as security, diagnostic, or administrative purposes. The recording service can allow a user to record the on-screen activities of the user, such as those activities in the virtualized desktop provided by the gateway to the client. The generation of the recording may be over any type of connection, subject to policies and network administration. The recordings of the sessions and catalogue of associated data may be archived for retrieval and playback. All of the on-screen activities may be recorded and packaged into a video file for playback.

While this approach to recording allows for playback, one issue may be that a viewer of the recording may be interested in the user's accessing of specific applications within the desktop environment. For example, if there is an error with a particular application, the viewer may be interested in a portion of the recording in which the user is interacting with the application. This issue may be more exacerbated when different viewers may be interested in different portions of the recording based on different application in use during the session. Viewing the desired portions of the recordings may entail meticulously watching the playback of the record frame by frame until the relevant portion appears. For example, in an attempt to save time, some viewers may manually play the recording forward and backward repeatedly to locate the portion of interest. Other viewers may wind through portions of the recording not of interest at twice or three times speed, and fall back to the normal speed for the portions of interest. Yet others may be unable to find the portions of interest from previewing thumbnails of the recording in the multimedia player. The inability to automatically identify portions of recordings corresponding to uses of different applications within the desktop environment may thus result in user frustration and by extension a severely low quality of human-computer interactions (HCI). Furthermore, the repeated manual attempts to find such portions within recordings may lead to higher consumption of computing resources, such as processor, memory, and network bandwidth.

To address these and other technical challenges, the recording service may detect a transition of the topmost window (or foreground) within the desktop environment while recording to use to generate clips corresponding to use of different application. Upon detection of the transition, the recording service may identify contextual information to write into metadata to identify a start frame and an end frame in the recording corresponding to the use of a particular application. The metadata generated using the transitions may include: a clip identifier for the particular clip; an application name for the application with the topmost window; a process identifier unique to the application; a start frame identifier; and an end frame identifier, among others. Using the metadata, the sets of frames corresponding to access of a particular application or a group of applications can be extracted from the overall source recording of the desktop environment. Using the extracted frames, the recording service may construct video clips for each of the applications. The identifications of the frames may be provided to the user, and upon user selection, the clip may be dynamically built for quick viewing by the user.

The recording service may implement the following logic for processing transitions between windows in the desktop environment. When topmost window changes and the current topmost window is a desktop root window, the recording service may determine that all the windows corresponding to applications are minimized. The recording service may identify the frame before the change in windows as an end frame of the last clip within the recording. The complete metadata identifying the start frame and end frame for the clip may be written and stored for extraction from the recording. Moreover, when the topmost window changes and the current window and the previous window are from different applications, the recording service may determine the transition as between different applications. The recording service may identify the frame prior to the transition as an end frame for the clip corresponding to the previously open application, and initiate composing metadata for the clip. Meanwhile, the recording service may cache the identification of the transition frame as a start frame tag for the currently active application. Conversely, when the topmost window changes but the process identifier remains the same, the recording service may determine no transition has occurred between different applications, and no metadata regarding the frames may be logged.

Since the recording system may detect the topmost window transitions between applications, the definition of the start and end frames may be guaranteed to not overlap between adjacent video clips. It is therefore possible to extract sets of frames, filtered by application name, from the overall recording. For instance, when an application firstly switches to the topmost window, the recording service may retrieve and cache application name, process identifier, and the sequential number of the current frame to be appended to a video file for the recording. When an application leaves from the topmost window, the recording system may also record the frame identifier into a metadata file, together with contextual information in cache.

With the assistance of the metadata, the recording service may extract frames corresponding to a particular application by filtering by application name or a combination of multiple filters to build a customized clip for quick pull and view. The user of the recording service may benefit from the construction of these clips. For one, the user may be able to view thumbnails of clips corresponding to the individual applications on a time axis of a session recording player. On the time axis, the thumbnail of each start frame identifier in the metadata file may be displayed for the user to preview the clip. The user may be able to quickly see the clips corresponding to individual clips upon request. For another, in the session recording player, the user may be able to apply an application filter using a name of the application to generate individualized clips from the overall recording. The generated video clip may contain frames between the start frame and the end frame identified in the metadata for the application named in the filter. The user can then view the generated video clip or save the video clip as a standalone video file.

Automatically generating clips corresponding to the uses of different applications in this manner may negate having to manually and meticulously find portions of the overall recording of the session. The recording service may thus improve the quality of human-computer interactions (HCI) between the user and the session recording player. In addition, the user no longer needs to manually find.

Aspects of the present disclosure are directed to systems, methods, and non-transitory computer readable media for defining a clip within a recording. A device may generate a recording of a session of a user via which a plurality of applications is accessible. The device may detect a transition of an application of the plurality of applications in a foreground of the session. The device may identify, from the recording, a frame corresponding to the transition in the foreground. The device may store an identification of the frame corresponding to the transition to define a clip of the user within the recording using the application in the session.

In some embodiments, the device may determine, responsive to detecting, that the transition is to a desktop interface in the foreground of the session. In some embodiments, the device may identify the frame to define an end of the clip of the user using the application, responsive to determining that the transition is to the desktop interface.

In some embodiments, the device may determine, responsive to determining that the transition is not to a desktop interface in the foreground, that the application is different from a second application previously in the foreground. In some embodiments, the device may identify the frame to define a start of the clip of the user using the application, responsive to determining that the application is different from the second application In some embodiments, the device may determine, responsive to determining that the application is different from a second application previously in the foreground, that a desktop interface was not previously in the foreground. In some embodiments, the device may identify identifying a second frame prior to the transition to define an end to a second clip of the user using the second application, responsive to determining that the desktop interface was not previously in the foreground.

In some embodiments, the device may determine, responsive to determining that the application is different from a second application previously in the foreground, that a desktop interface was previously in the foreground. In some embodiments, the device may continue, responsive to determining that the desktop interface was previously in the foreground, generating the recording of the session, with an identification of the frame to define a start of the clip of the user using the application.

In some embodiments, the device may determine, responsive to determining that a second transition between a first window and a second window in the foreground, that the first window and the second window are associated with the application. In some embodiments, the device may continue, responsive to determining that the first window and the second window are associated with the application, generating the recording of the session, without identification of a second frame corresponding to the second transition.

In some embodiments, the device may generate the recording of the session hosted on a virtual machine to provide the user on a client access to the plurality of applications via the session. In some embodiments, the device may monitor for the transition in the foreground of the session, concurrent to the generation of the recording of the session of the user accessing one or more of the plurality of applications.

In some embodiments, the device may generate, for the recording, metadata identifying: (i) an identifier of the clip, (ii) an identifier associated with the application, and (iii) an identifier referencing the frame in the recording. In some embodiments, the device may generate, from the recording, the clip of the user using the application in the session in accordance with the frame.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
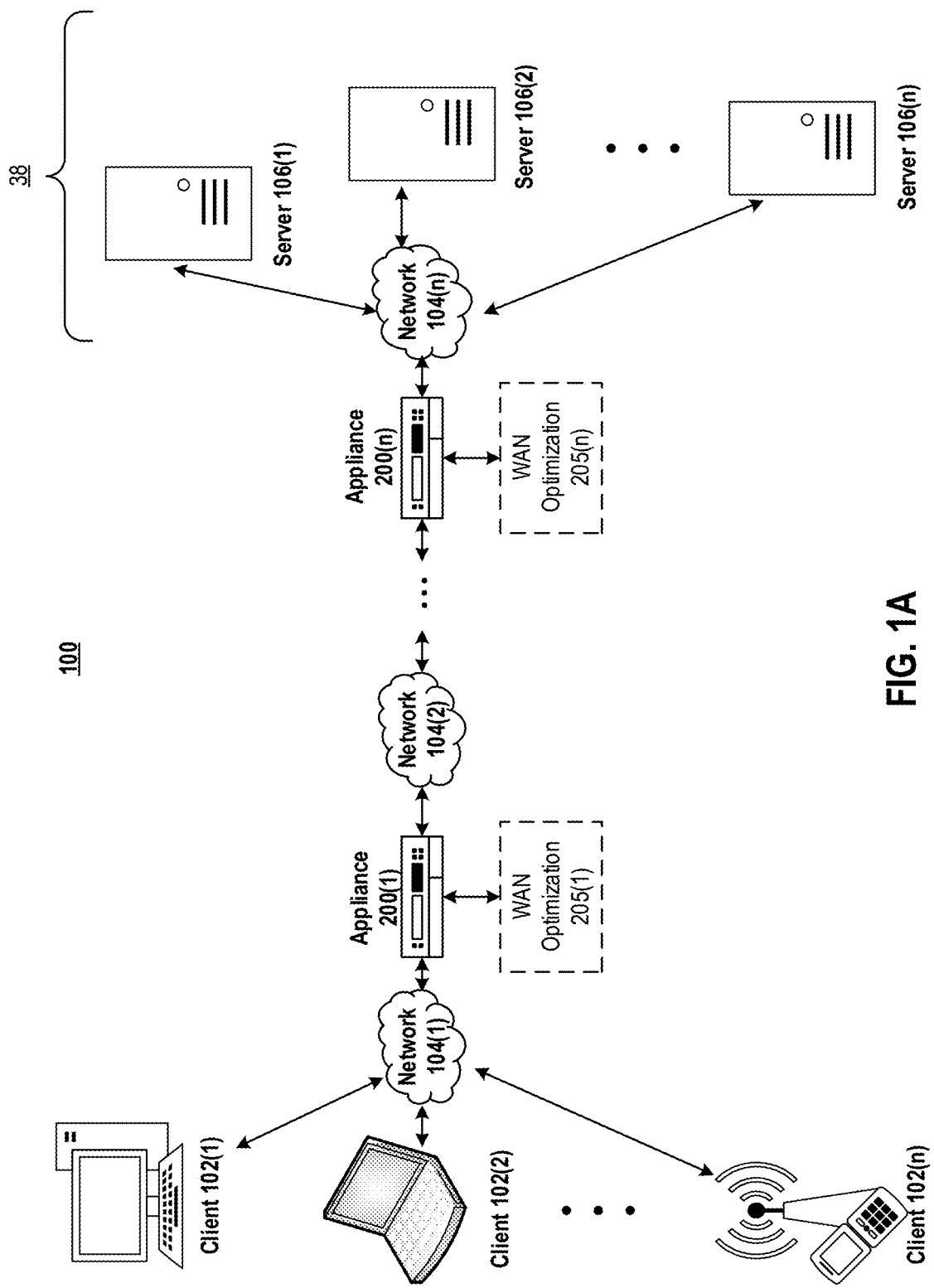
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for defining clips of application use within a recording of a session.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200(n) (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network 104 or different types of networks 104. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, FL.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS).

In some embodiments, appliance 200 may be a performance enhancing proxy or a WAN optimization controller. In one embodiment, appliance 200 may be implemented as CloudBridge® products sold by Citrix Systems, Inc. of Fort Lauderdale, FL.

Figure 1B:
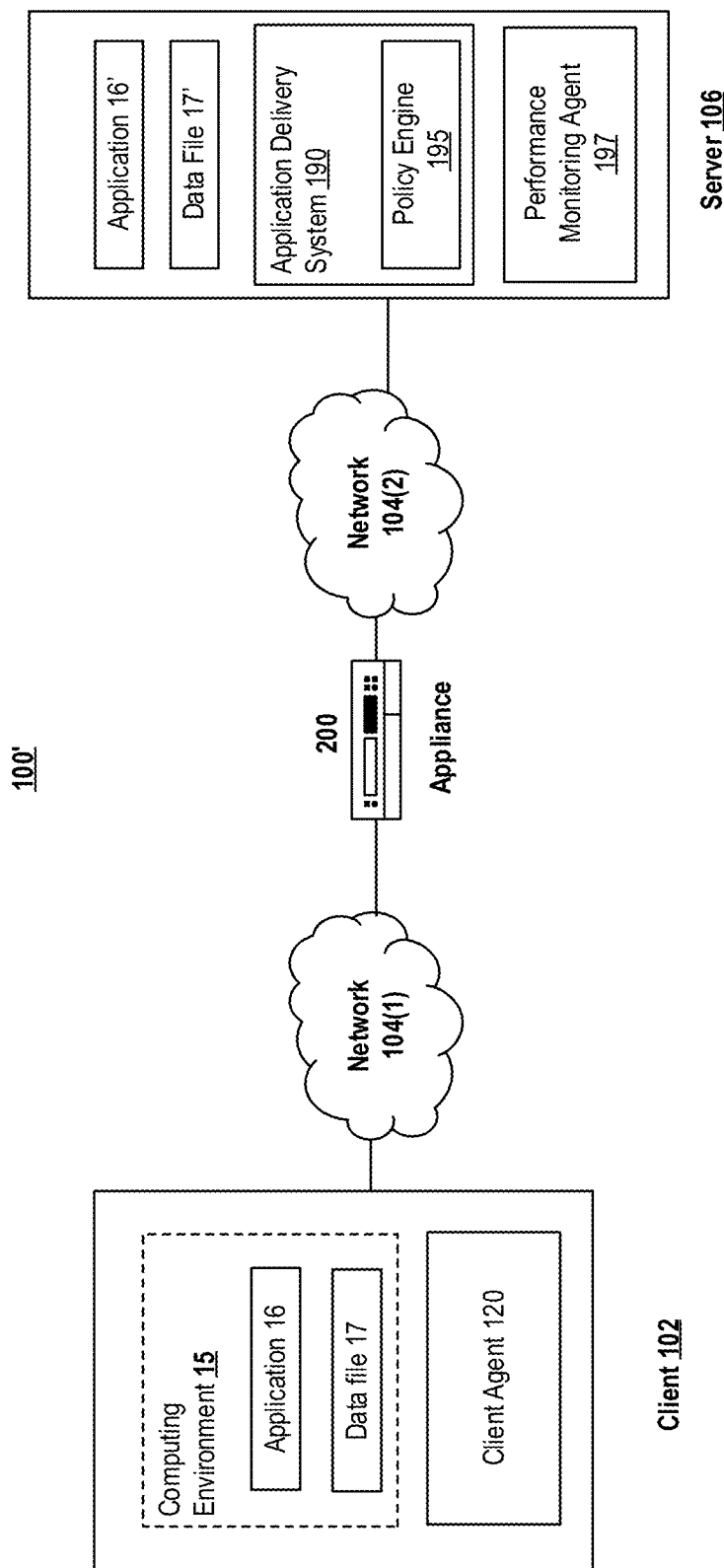
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment 100 on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file 17 processable by the application 16 from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 102 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, FL. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of the servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, FL.

The monitoring agents 120 and 197 may monitor, measure, collect, and/or analyze data on a predetermined frequency, based upon an occurrence of given event(s), or in real time during operation of network environment 100. The monitoring agents 120 and 197 may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
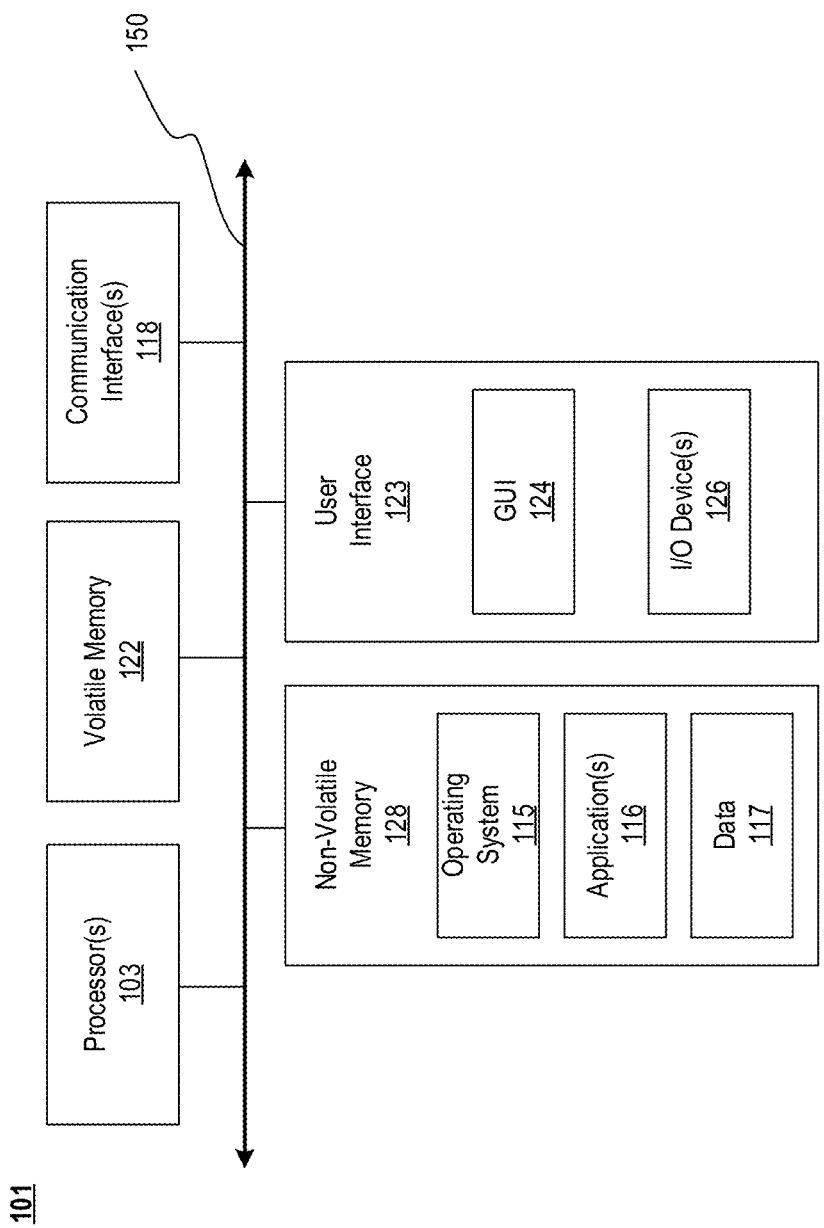
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
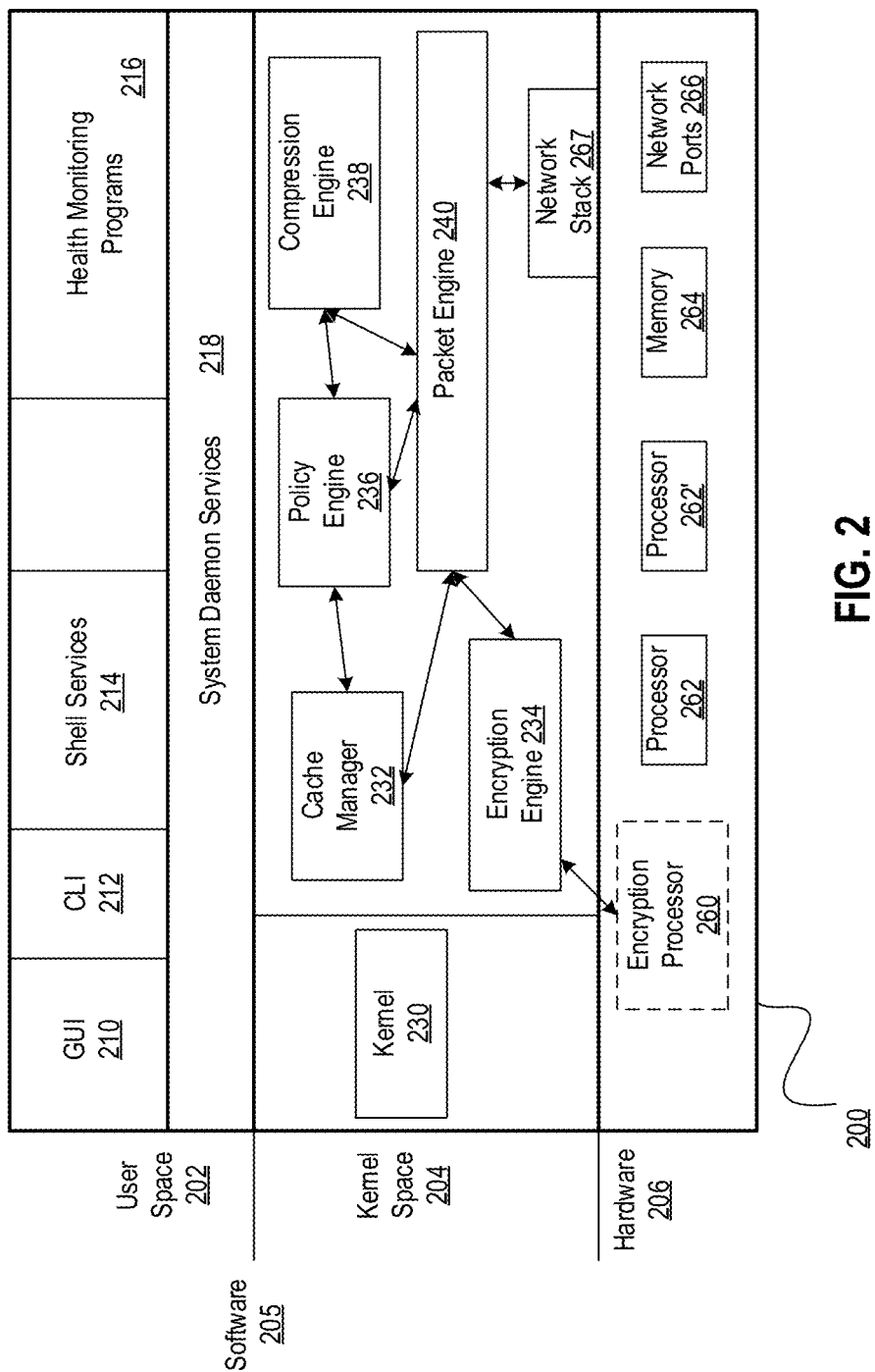
FIG. 2 is a block diagram of an appliance for processing communications between a client and a server, in accordance with an illustrative embodiment.

FIG. 2 shows an example embodiment of appliance 200 and 205. As described herein, appliance 200 and 205 may be implemented as a server 106, gateway 200, router, switch, bridge or other type of computing 101 or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 124, a command line interface (CLI) 212, shell services 214, health monitor 216, and daemon services 218. GUI 124 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of the following; encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service 218 may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or executed one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, FL. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, FL.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
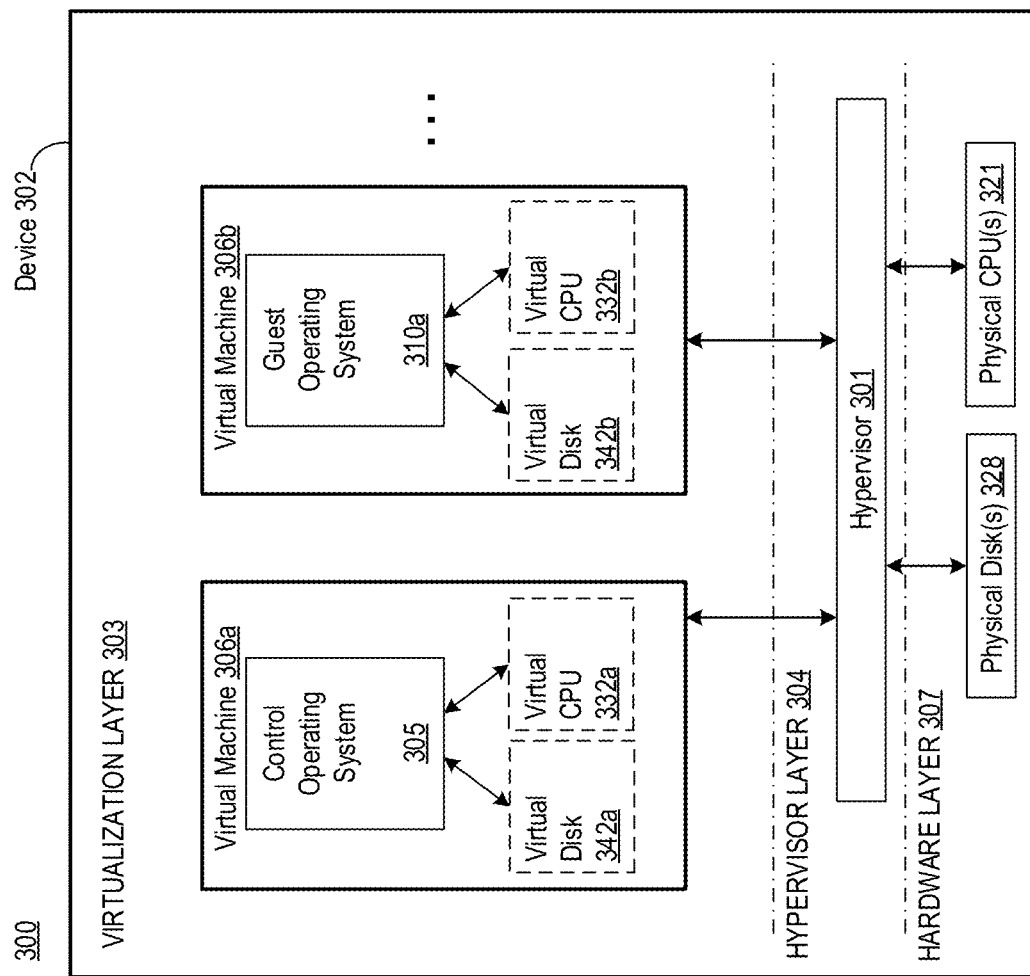
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
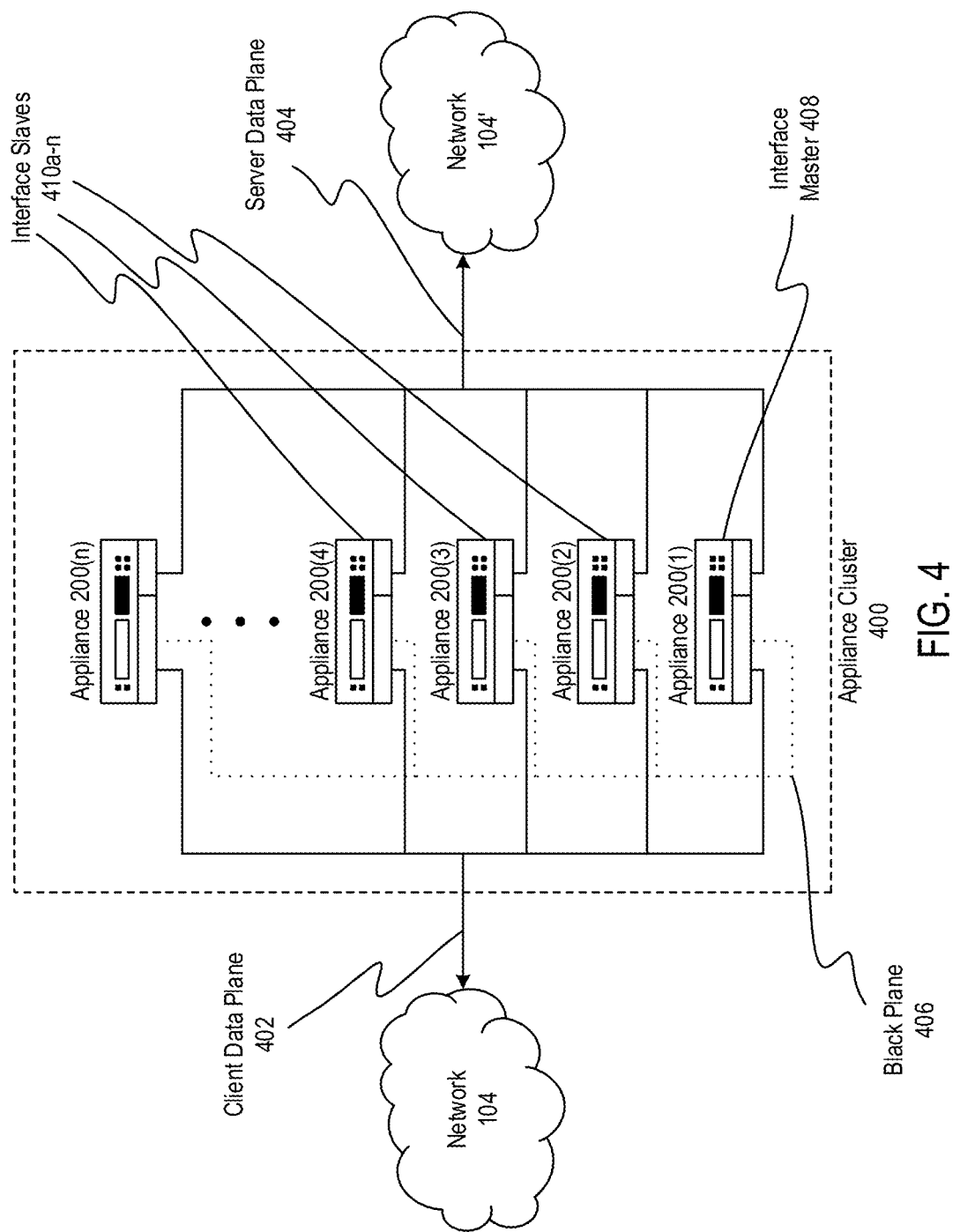
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Figure 5:
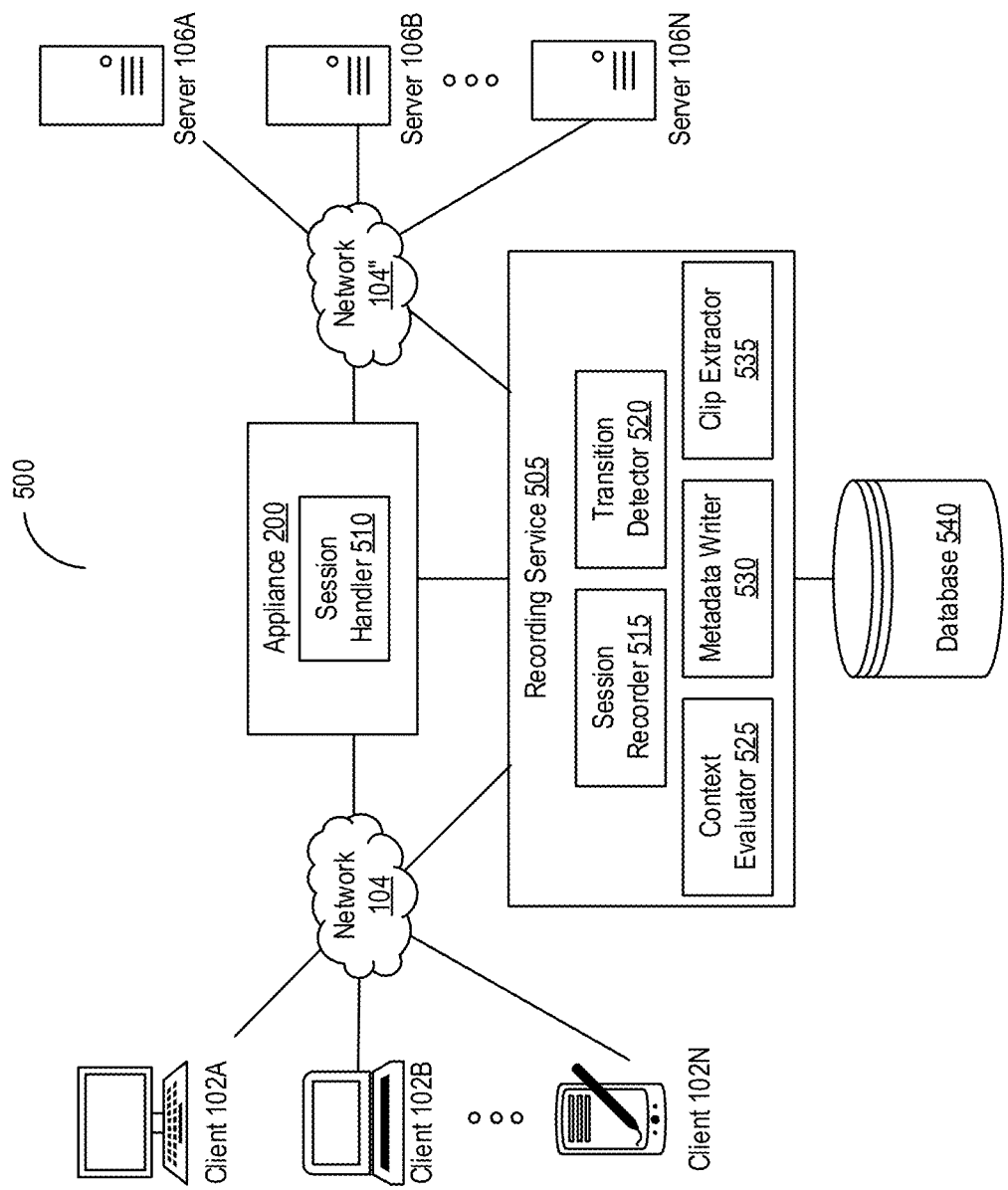
FIG. 5 is a block diagram of an embodiment of a system for defining clips of application used within a recording of a session, in accordance with an illustrative embodiment.

E. Systems and Methods for Defining Clips of Application Use Within Recordings of Sessions Referring now to FIG. 5, depicted is a system 500 for defining clips of application use within a recording of a session. In overview, the system 500 may include one or more clients 102a-n (hereinafter generally referred to as clients 102), one or more servers 106a-n (hereinafter generally referred to as servers 106), at least one appliance 200, and at least one recording service 505, among others. The system 500 may also include at least one network 104 to communicatively couple the clients 102, the appliance 200, and the recording service 505, among others. The system 500 may include at least one network 104' to communicatively couple the servers 106, the appliance 200, and the recording service 505, among others. The appliance 200 may include at least one session handler 510. The recording service 505 may include at least one session recorder 515, at least one transition detector 520, at least one context evaluator 525, at least one metadata writer 530, and at least one clip extractor 535, among others. The recording service 505 may include or may have access to at least one database 540. In some embodiments, the recording service 505 may be separate (e.g., as depicted) or a part of one of the clients 102, the servers 106, or the appliance 200, among others.

The systems and methods of the present solution may be implemented in any type and form of device, including clients 102, servers 106, appliances 200, or the recording service 505. As referenced herein, a "server" may sometimes refer to any device in a client-server relationship, e.g., an appliance 200 in a handshake with a client device 102. The present systems and methods may be implemented in any intermediary device or gateway, such as any embodiments of the appliances 200, the recording service 505, or other device described herein. Some portion of the present systems and methods may be implemented as part of a packet processing engine or virtual server of an appliance, for instance. The systems and methods may be implemented in any type and form of environment, including multi-core appliances, virtualized environments and/or clustered environments described herein.

Figure 6A:
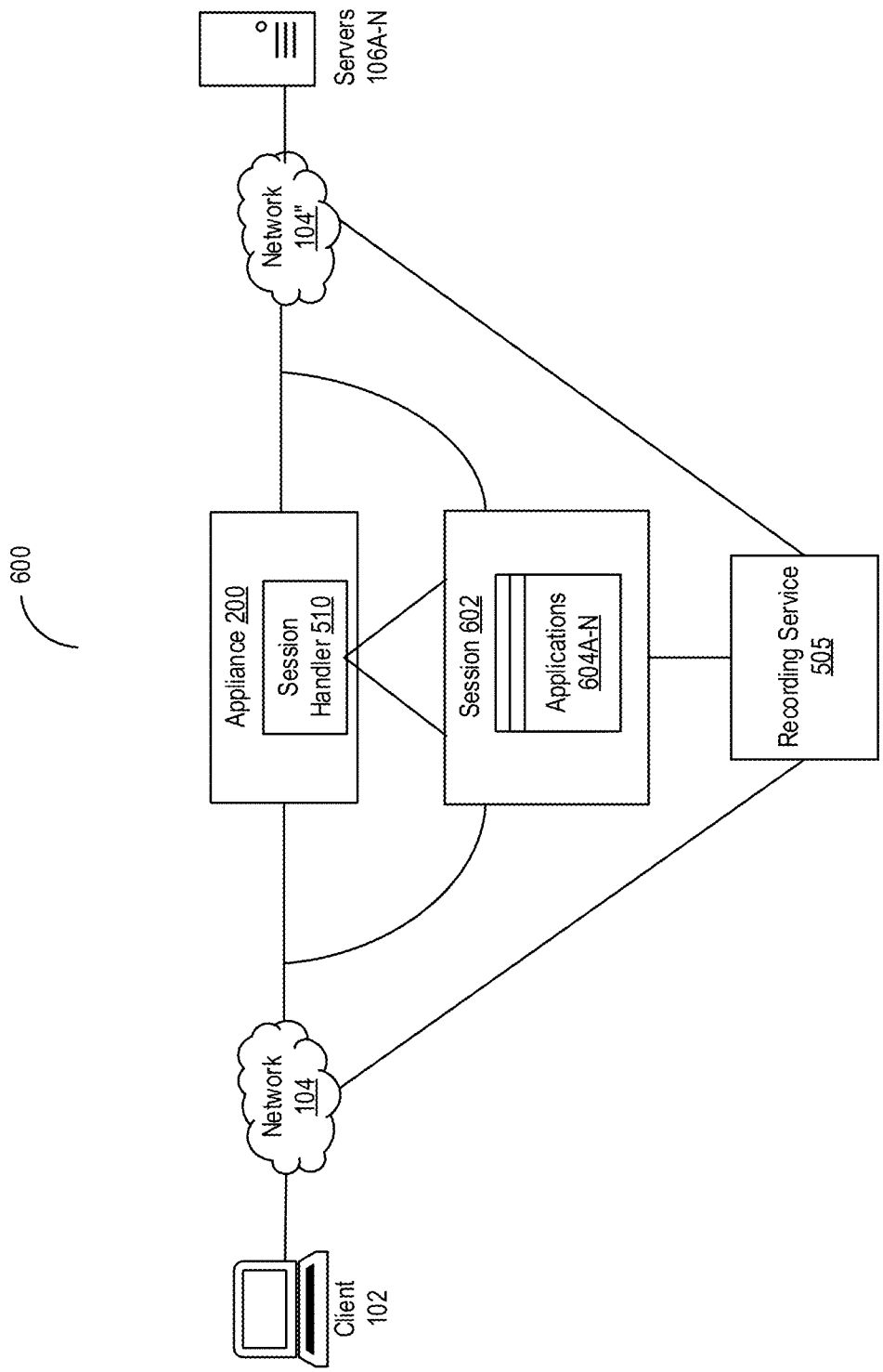
FIG. 6A is a block diagram of an embodiment of a process for establishing sessions in the system for defining clips, in accordance with an illustrative embodiment.

Referring now to FIG. 6A, depicted is a block diagram of a process 600 for establishing sessions in the system 500 for defining clips. The process 600 may correspond to or include operations performed in the system 500 to initiate a session between one of the clients 102 and one or more of the servers 106 through the appliance 200. Under the process 600, the session handler 510 executing on the appliance 200 may initiate and establish at least one session 602 for the client 102 over the network 104. In some embodiments, the session handler 510 may establish the session 602 in response to receipt of a request for a session from the client 102. The request may identify one or more applications 604A-N (hereinafter generally referred to as applications 604) to be accessed by the client 102 through the session 602. Access by the client 102 to the applications 604 and other resources hosted on the servers 106 may be controlled and managed by the session handler 510.

Through the session 602, the session handler 510 may provide the client 102 access to the applications 604. The session 602 may include or correspond to a virtual desktop (e.g., via the virtual machine 306) that facilitates access to resources for the applications 604 hosted on one or more of the servers 106. In some embodiments, the session 602 may include or correspond to a virtual desktop that facilitates access to resources for the applications 604 hosted on the servers 106. For example, the session handler 510 may instantiate the virtual desktop upon request or identify an already existing virtual desktop to provide to the client 102. The virtual desktop may be in accordance with a protocol with the provision of the applications 604 from the server 106 to the client 102, such as the Remote Desktop Protocol (RDP) or the Independent Computing Architecture (ICA), among others. When provided to the client 102, the virtual desktop for the session 602 may be presented or rendered in at least a portion of the display of the client 102, such as a window for the agent on the client 102 for accessing the appliance 200. In some embodiments, the session 602 may correspond to a desktop native to the client 102. For example, the session 602 may correspond to a login session to an operating system on the client 102, and the applications 604 may correspond to programs installed on the client 102.

The recording service 505 may have visibility or may access the session 602 supported by the session handler 510 on the appliance 200. With the visibility, the recording service 505 may record the session 602 of the user accessing one or more of the applications 604. In some embodiments, the recording service 505 may be a part of the appliance 200 and have access to the session 602 established and managed by the session handler 510. For example, the recording service 505 may use hooking on the session handler 510 to intercept the communications and rendering of the session 602. In some embodiments, the recording service 505 may be separate from the appliance 200 and be communicatively coupled with the appliance 200 to access the session 602 established and managed by the session handler 510. For example, the recording service 505 may use hooking on the session handler 510 to communicate the function calls and rendering from the session 602 to the recording service 505. In some embodiments, the session handler 510 may transmit, provide, or send a rendering of the session 602 (e.g., a rendering of the virtual desktop) to the recording service 505. In some embodiments, the recording service 505 may be a part of the client 102 and have visibility to the session 602. For example, the recording service 505 may be a background process running on the client 102.

Figure 6B:
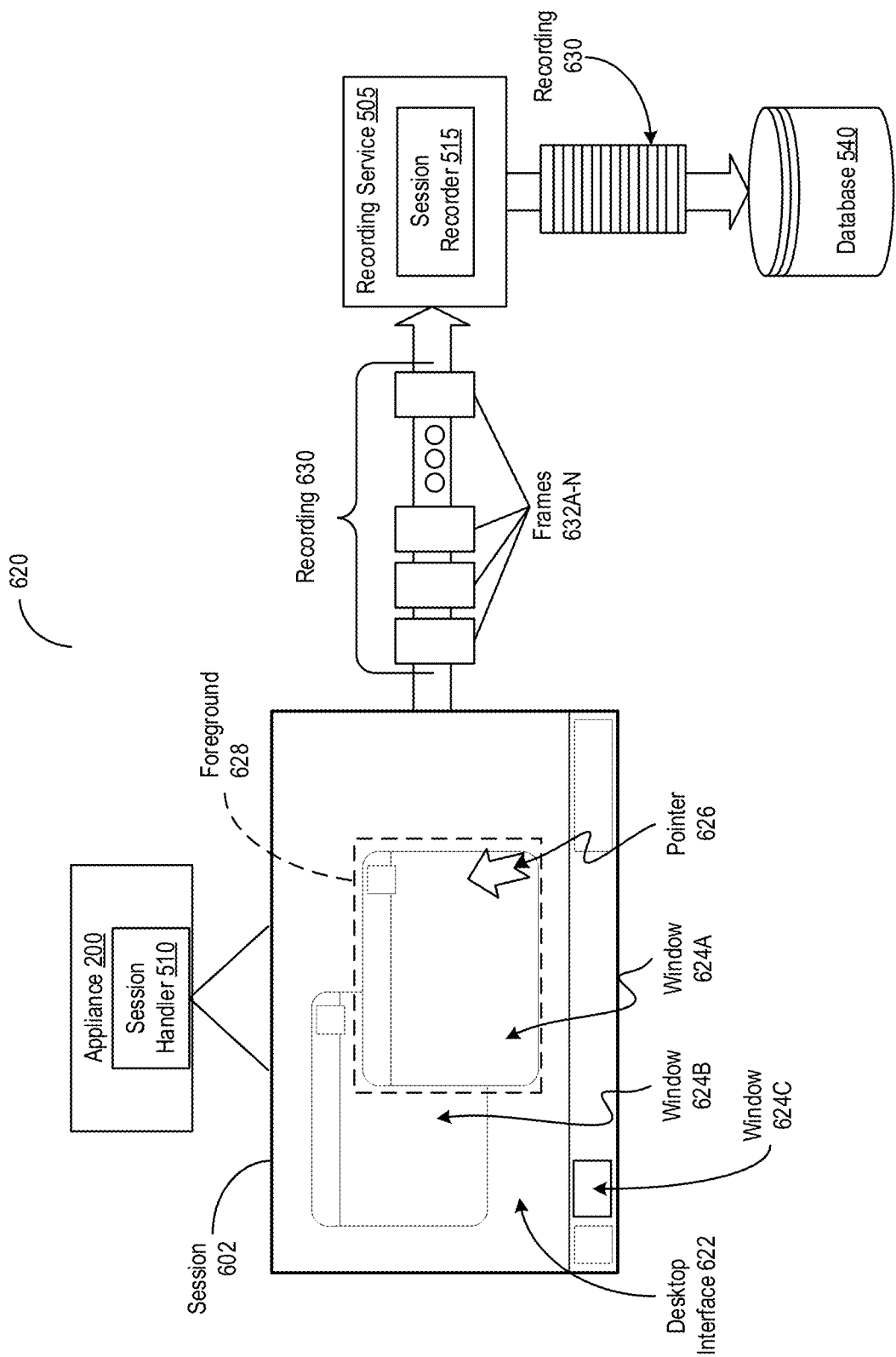
FIG. 6B is a block diagram of an embodiment of a process for recording sessions in the system for defining clips, in accordance with an illustrative embodiment.

Referring now to FIG. 6B, depicted is a block diagram of a process 620 for recording sessions in the system for defining clips. The process 620 may correspond to or include operations performed in the system 500 to generate recordings of sessions of the user via which the applications 604 are accessible, and may be a continuation of the process 600 discussed above. Under the process 620, the session 602 may include at least one desktop interface 622 (sometimes herein referred to as a desktop environment). For example, the desktop interface 622 may correspond to the virtual desktop provided to the client 102 and managed by the session handler 510. The desktop interface 622 may correspond to a graphical user interface (GUI) for an operating system to provide the user access to one or more applications 604 accessible through the session 602. The base GUI of the desktop interface 622 may correspond to a root window or desktop root window. The desktop interface 622 may include any number of GUI elements, such as command buttons, icons, folders, textboxes, toolbars, and windows, among others, for accessing applications 604, files, resources, and other functions of the operating system.

The desktop interface 622 may include one or more windows 624A-N (hereinafter generally referred to as windows 624), among others. Each window 624 may correspond to a GUI or a set of GUI elements belonging to one of the applications 604 running in the session 602. At least one application 604 may be associated with multiple windows 624. For example, a first window 624A and a second window 624B displayed in the desktop interface 622 may be associated with the same application 604. At least one application 604 may be associated with a single window 624. For instance, the first window 624A and the second window 624B may be associated with two different applications 604A and 604B respectively. The GUI elements in each window 624 may correspond to different functions of the respective application 604 provided in the session 602.

The desktop interface 622 may include at least one pointer 626 (sometimes hereinafter referred to as a cursor). The pointer 626 may identify or indicate a current position of a user interaction of a user of the client 102 detected via an input/output (I/O) device (e.g., a mouse, a trackball, touchpad, or touchscreen, among others) within the desktop interface 622.

In the desktop interface 622, the window 624 of each application 604 may have an open state, a minimized state, or a closed state, among others. When in the open state, the window 624 may be displayed in at least an area of the desktop interface 622. For example, as depicted, the first window 624A and the second window 624B in the desktop interface 622 may be in the open state. When in the minimized state, the window 624 may be not displayed in the desktop interface 622 and the corresponding application 604 may be displayed as at least one GUI element in the desktop interface 622. In the depicted example, the third window 624C may be displayed as a button in a taskbar along the bottom of the desktop interface 622. When in the closed state, the window 624 may lack any visual indicator of the application 604 within the desktop interface 622, and may correspond to applications 604 not running in the session 602.

The desktop interface 622 may have at least one foreground 628 (sometimes referred herein as a topmost window). The foreground 628 may correspond to at least one of the windows 624 that is currently open and activated in the desktop interface 622. The foreground 628 may correspond to the window 624 interacted with by the user of the session 602. The foreground 628 may correspond to the window 624 that appears or is displayed above all the remaining windows 624 in the desktop interface 622. For example, as depicted, the foreground 628 may correspond to the first window 624A displayed above the second window 624B within the desktop interface 622. The first window 624A may be interacted with by the user using the pointer 626. The second window 624B and the third window 624C may correspond to or may be a part of a background of the desktop interface 622.

As the user is interacting with the desktop interface 622, the session handler 510 may change, adjust, or otherwise update the rendering of the session 602. The session handler 510 may monitor for an interaction with the GUI elements of the desktop interface 622 (e.g., using the I/O device of the client 102). The GUI element interacted with may be associated with the operating system or of the windows 624 belonging to one or more applications 604 within the session 602. In response to detecting the interaction with a GUI element in the desktop interface 622, the session handler 510 (or the client 102) may carry out or perform the operations triggered by the interaction with the GUI element. The performance of the operations may be specified or defined by the session 602, the operation system of the desktop, the desktop interface 622, or the application 604 associated with the window 624, among others. In accordance with the operation, the session handler 510 may modify or update the rendering of the virtual desktop corresponding to the session 602. For example, the session handler 510 may remove the display of the window 624 from an area of the desktop interface 622 upon detecting a user interaction to close the window 624 as indicated by the pointer 626.

In conjunction with the running of the session 602, the session recorder 515 executing on the recording service 505 may create, produce, or otherwise generate at least one recording 630 of the session 602. The generation of the recording 630 may be performed concurrently with the accessing of the session 602 by the user. To generate the recording 630, the session recorder 515 may retrieve, identify, or otherwise acquire the rendering of the session 602. In some embodiments, the session recorder 515 may access the session 602 managed by the session handler 510 to retrieve, obtain, or otherwise acquire the rendering of the desktop interface 622 of the session 602. For example, the session recorder 515 may retrieve the rendering of the virtual desktop for the session 602 hosted a virtual machine (e.g., the virtual machine 306) by the session handler 510 on the appliance 200 in generating the recording 630. The acquisition of the renderings of the session 602 may be in accordance to video specifications, such as a frame rate (e.g., ranging from 10 to 600 frames per second), resolution (e.g., 408p, 720p, 1080p, 4K UHD, and 8K UHD), and video coding (e.g., H.120, H.261, MPEG-1, MPEG-2, MPEG-4, and H.265), among others. The session recorder 515 may acquire or identify each consecutive rendering of the session 602 according to the specifications.

Using the acquired rendering, the session recorder 515 may create, produce, or generate at least one corresponding frame 632A-N (hereinafter generally referred to frames 632) to insert or include into the recording 630. Each frame 632 may correspond to the acquired rendering of the session 602. For example, the frame 632 may include the rendering of the overall desktop interface 622 (e.g., the virtual desktop for the session 602) including the one or more applications 604 of the session 602. The frame 632 may be generated in accordance with the video specifications, such as the resolution and the video coding as discussed above. Once generated, the session recorder 515 may include or insert the frame 632 into the recording 630. The recording 630 may include the set of frames 632 in the order of acquisition from the session 602. For example, the session recorder 515 may include the set of frames 632 in chronological order as the user interacts with the GUI elements in the desktop interface 622.

The session recorder 515 may store and maintain the recording 630 on the database 540. In some embodiments, the recording 630 may be stored and maintained on the client 102 (e.g., on a local storage) that is accessing the session 602. In some embodiments, the session recorder 515 may write or add the frame 632 to the recording 630 existing on the database 540. In some embodiments, the session recorder 515 may generate and store the recording 630 onto the database 540 upon termination of the session 602. The recording 630 may be stored and maintained as a video file on the database 540. The video file may be generated in accordance with the video acquisition properties. The video file for the recording 630 may be of any video format, such as MPEG-1, MPEG-2, MPEG-4, AVI, MOV, and WMV, among others.

Figure 6C:
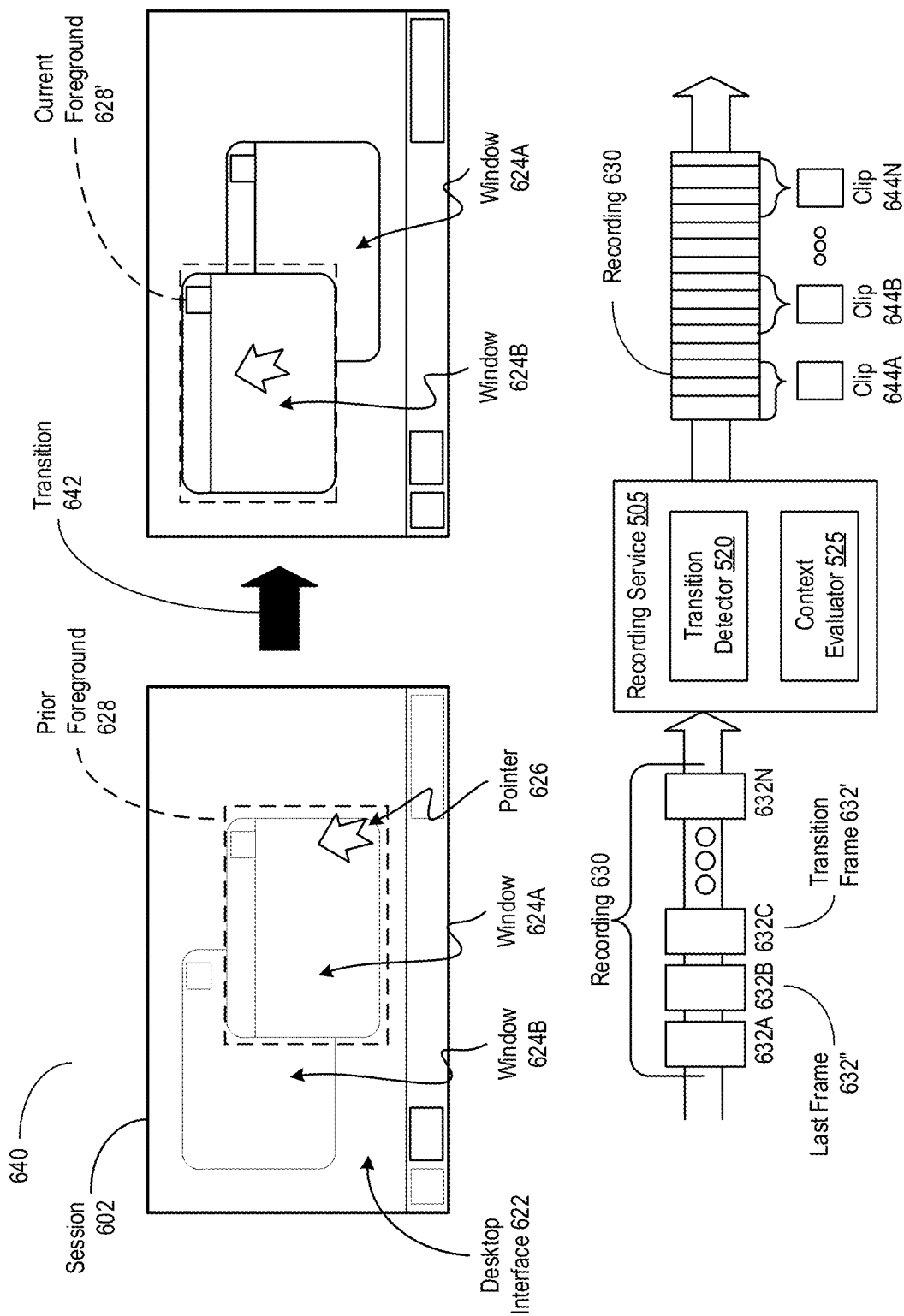
FIG. 6C is a block diagram of an embodiment of a process for detecting transitions in the system for defining clips, in accordance with an illustrative embodiment.

Referring now to FIG. 6C, depicted is a block diagram of a process 640 for detecting transitions in the system for defining clips. The process 640 may correspond to or include operations performed in the system 500 to define one or more clips from recordings associated with applications running in the session, and may be a continuation of the process 620 discussed above. Under the process 640, the transition detector 520 executing on the recording service 505 may monitor for at least one transition 642 in the foreground 628 of the desktop interface 622. The monitoring can be concurrent with the session recorder 515 generating the recording 630 of the session 602. The transition 642 may be among the applications 604 accessible via the session 602 in the foreground 628 of the desktop interface 622. The transition 642 may correspond to a change in the foreground 628 from one window 624 to another window 624. For example, as indicated in the difference between the foreground 628 on the left and current foreground 628' on the right in the depiction, the transition 642 may correspond to a change in focus from the first window 624A to the second window 624B in response to a user interaction via the pointer 626. The transition 642 may also correspond to the change in the foreground 628 from one window 624 to the overall desktop interface 622 (sometimes referred herein as a root window).

To monitor for the transition 642, the transition detector 520 may determine or identify the change in the foreground 628 within the desktop interface 622 of the session 602. In some embodiments, the transition detector 520 may retrieve, acquire, or identify the change in the foreground 628 from the session 602 on the session handler 510. In some embodiments, the transition detector 520 may use a script in the session handler 510 or the session 602 through machine on the appliance 200 hosting the session 602. The script may be included in the session handler 510 or the session 602 hosted on the appliance 200 via hooking or injection. In some embodiments, when the session 602 native to the client 102 is being recorded, the script can be included on the client 102.

The script may keep track of the foreground 628 in the desktop interface 622 of the session 602. Upon detecting an event in the session 602, the script may identify the foreground 628 in the desktop interface 622. The event may include, for example: a user interaction in the session 602; triggering of a function or process of the operating system for the session 602; or launching of the application 604 in the session 602, among others. For instance, in a Windows operating system environment, the script may check the "Systems.Topmost" property to identify the current foreground 628, in response to detecting a user interaction in the desktop interface 622. If the foreground 628 does not change with the event, the script may forego any provision of the identification and continue to monitor for changes in the foreground 628. If the foreground 628 changes with the event, the script may send, convey, or otherwise provide an identification of the transition 642 to the transition detector 520. With the receipt of the identification from the script, the transition detector 520 may detect the transition 642 in the foreground 628 (e.g., from the foreground 628 as depicted on the left to the foreground 628' as depicted on the right).

In some embodiments, the transition detector 520 itself may keep track of the current foreground 628' in the desktop interface 622 to detect the transition 642. The transition detector 520 may interface with the session 602 or the session handler 510 to access the session 602. From accessing, the transition detector 520 may retrieve, acquire, or identify the current foreground 628' in the desktop interface 622 of the session 602. For example, in a Windows operating system environment, the transition detector 520 may identify the current foreground 628' from the "Systems.Topmost" property of the operating system for the session 602. The identification of the foreground 628' may be repeatedly performed at a frame rate. The frame rate may be the same as or different from the frame rate of the recording 630. With each identification, the transition detector 520 may compare the current foreground 628' with the previous foreground 628. When the current foreground 628' does not differ from the previous foreground 628, the transition detector 520 may determine that there is no transition 642. Conversely, when the current foreground 628' differs from the previous foreground 628, the transition detector 520 may detect the change as the transition 642.

Upon detecting the transition 642, the context evaluator 525 executing on the recording service 505 may retrieve, receive, or otherwise identify information on the current foreground 628. In addition, the context evaluator 525 may also retrieve, receive, or otherwise identify the previous foreground 628. The information on the foreground 628 or 628' may be identified from the session 602 (e.g., using hooking or injection). As discussed above, the foreground 628 and 628' may correspond to one of the windows 624 in the desktop interface 622 or the desktop interface 622 itself (e.g., the desktop root window). The information may identify the window 624 or the desktop interface 622 in the foreground 628 or 628'. If the foreground 628 or 628' corresponds to one of the windows 624, the information on the foreground 628 or 628' may identify or include the application 604 accessed in the session 602. If the foreground 628 or 628' corresponds to the desktop interface 622, the information may identify or include the desktop interface 622 as accessed in the session 602.

In conjunction, the context evaluator 525 may find, select, or otherwise identify at least one transition frame 632' from the recording 630. The transition frame 632' may be one of the set of frames 632 in the recording 630 corresponding to the transition 642. In the depicted example, the transition frame 632' may be the frame 632 with the change from the first window 624A to the second window 624B in the desktop interface 622. The transition frame 632' may be also the first frame 632 in the recording 630 in which the second window 624B is displayed for the first time above the first window 624A in the recording 630. With the identification, the context evaluator 525 may select or identify a frame identifier corresponding to or referencing the transition frame 632'. The frame identifier may be an index or number of the corresponding frame 632 within the recording 630. In some embodiments, the context evaluator 525 may store and maintain the identification of the transition frame 632' on the database 540.

In addition, the context evaluator 525 may find, select, or otherwise identify at least one last frame 632". The last frame 632" may be one of the set of frames 632 in the recording 630 prior to the transition frame 632' corresponding to the transition 642. Upon identifying the transition frame 632', the context evaluator 525 may identify the frame 632 in the recording 630 prior to the transition frame 632' as the last frame 632". With the identification, the context evaluator 525 may select or identify a frame identifier corresponding to or referencing the last frame 632". The frame identifier may be an index or number of the corresponding frame 632 within the recording 630. In some embodiments, the context evaluator 525 may store and maintain the identification of the last frame 632" on the database 540.

Based on the information on the foreground 628', the transition frame 632', and the last frame 632", the context evaluator 525 may identify or define one or more clips 644A-N (hereinafter generally referred to as clips 644) from the recording 630. Each clip 644 may correspond to the user using the application 604 in the session 602. Each clip 644 may also correspond to a portion of the recording 630 in which the user is using at least one of the applications 604 in the session 602. Each clip 644 may include a subset of frames 632 of the recording 630 delineated by the transition frame 632' and the last frame 632". The start of the clip 644 may correspond to the identified transition frame 632', and the end of the clip 644 may correspond to the last frame 632". For example, the definition for the clip 644 may include the transition frame 632' as the start and the last frame 632" as the end. The portions of the recording 630 from which the clips 644 correspond may lack overlap. The clips 644 themselves may be generated at a later point, and the definitions for the potential clips 644 may be determined by the context evaluator 525 in advance, prior to the generation of the clips 644 from the recording 630.

Figure 6D:
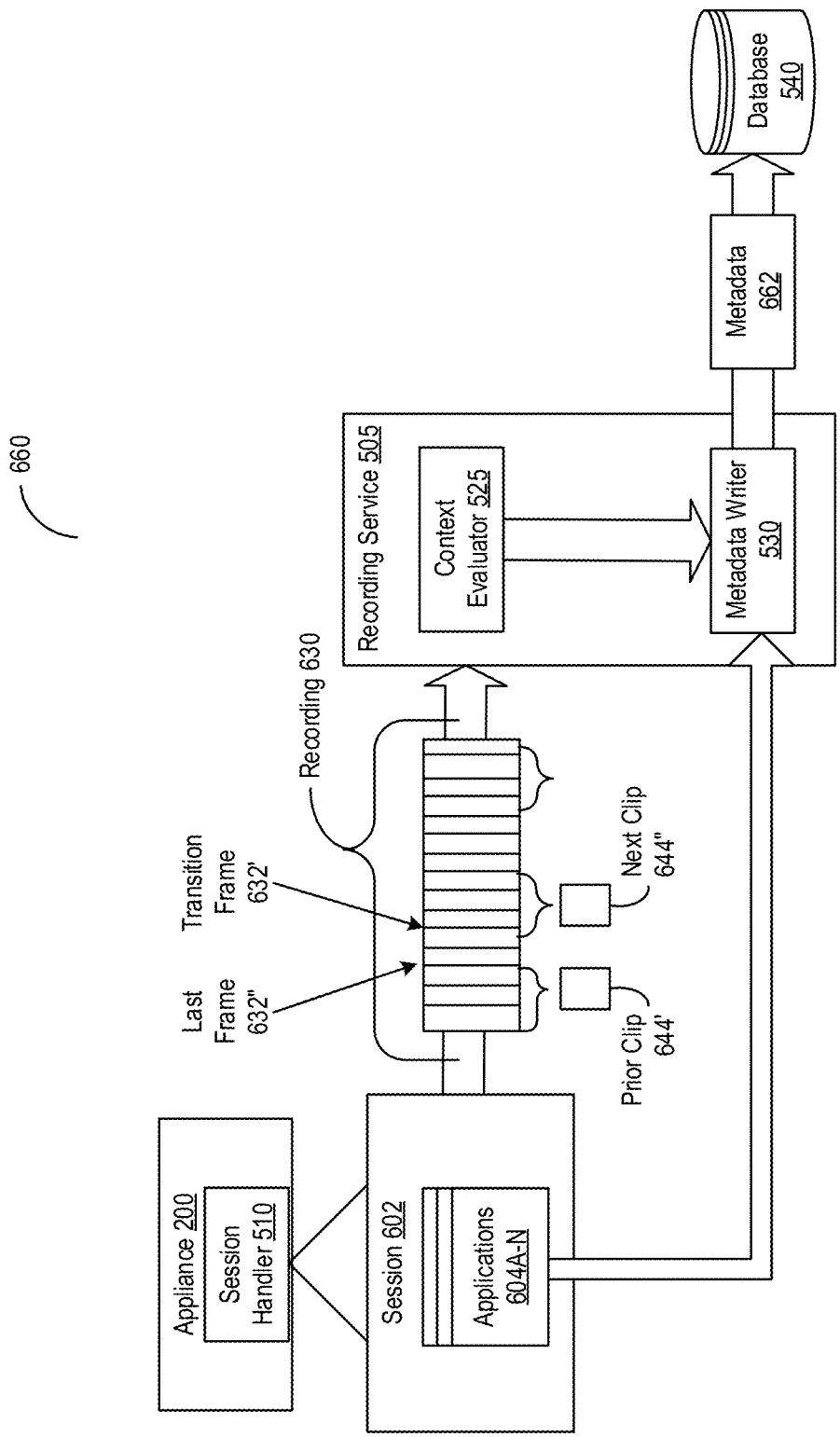
FIG. 6D is a block diagram of an embodiment of a process for generating metadata in the system for defining clips, in accordance with an illustrative embodiment.

Referring now to FIG. 6D, depicted is a block diagram of a process 660 for generating metadata in the system for defining clips. The process 660 may correspond to or include operations performed in the system 500 to generate and store metadata for the recording of the session, and may be a continuation of the process 640 discussed above. Under the process 660, the metadata writer 530 may create, produce, or otherwise generate metadata 662. The metadata 662 may be used to define the one or more clips 644 from the recording 630. In some embodiments, the metadata writer 530 may generate the metadata 662 for each clip 644. The metadata 662 may include or identify: a clip identifier referencing the corresponding clip 644; a process identifier corresponding a process underlying the application 604 in the duration of the clip 644; an application name for the application 604 used in the session 602 in the duration of the clip 644; a frame identifier corresponding to the frame 632 for the start of the clip 644 from the recording 630, and a frame identifier corresponding to the frame 632 for the end of the clip 644 from the recording 630, among others. In generating the metadata 662, the metadata writer 530 may interface with the session 602 managed by the session handler 510 and context evaluator 525.

Using the information on the foreground 628', the context evaluator 525 may identify or determine whether the transition 642 is to the desktop interface 622 in the foreground 628' of the session 602. The transition 642 in this circumstance may correspond to a change in to the foreground 628' from one of the windows 624 associated with one or more applications 604 to the desktop interface 622 (e.g., the desktop root window). If the transition 642 is determined to be to the desktop interface 628, the context evaluator 525 may identify the last frame 632" to define the end of a prior clip 644'. The prior clip 644' may be of the user using the application 604 corresponding to the window 624 previously in the foreground 628, prior to the transition 642 to the desktop interface 622.

In addition, the metadata writer 530 may generate the metadata 662 for the prior clip 644'. In generating, the metadata writer 530 may create a clip identifier for the prior clip 644'. The clip identifier generated by the metadata writer 530 may be based on a number of clips 644 created from the recording 630. For example, the metadata writer 530 may maintain a counter to generate the clip identifier for the prior clip 644'. The metadata writer 530 may access the session 602 to identify the application 604 corresponding to the window 624 in the foreground 628 prior to the transition 642. With the identification, the metadata writer 530 may identify the process identifier and the application name for the application 604. The metadata writer 530 may identify the frame identifier for the previous transition frame 632' as the start of the prior clip 644'. The metadata writer 530 may further identify the frame identifier for the last frame 644 as the end of the prior clip 644'. With the identification, the metadata writer 530 may generate the metadata 662 and store the generated metadata 662 on the database 540.

On the other hand, if the transition 642 is determined to be not to the desktop interface 622, the context evaluator 525 may determine whether that the application 604 in the current foreground 628' is different from the application 604 in the previous foreground 628. To determine, the context evaluator 525 may identify the application 604 associated with the window 624 in the previous foreground 628 and the application 604 associated with the window 624 in the current foreground 628'. With the identification, the context evaluator 525 may compare the application 604 associated with the window 624 in the previous foreground 628 and the application 604 associated with the window 624 in the current foreground 628'.

If the windows 624 are determined to be associated with the same application 604, the context evaluator 525 may determine that the application 604 in the current foreground 628' is the same as the application 604 in the previous foreground 628. In addition, the context evaluator 525 may refrain from defining any clip 644. With no clip 644 defined, the metadata writer 530 may also abstain from generating the metadata clip 662. The recording 630 of the session 602 may continue to be generated by the session recorder 515, without identification of the transition frame 632' corresponding to the transition 642. If the windows are determined to be associated with different applications 604, the context evaluator 525 may identify the transition frame 632' to define a start of a next clip 644". The next clip 644" may be of the user using the application 604 corresponding to the window 624 now in the foreground 628'. The application 604 in use in the next clip 644" may differ from the application 604 in use in the prior clip 644'. In some embodiments, the context evaluator 525 or the metadata writer 530 may cache or store the frame identifier for the transition frame 632'. The frame identifier may be subsequently used to define the next clip 644" of the user within the recording 630 using the application 604 in the session 602.

Furthermore, the context evaluator 525 may determine whether the desktop interface 622 was in previous foreground 628 before the transition 642. To determine, the context evaluator 525 may identify whether the window 624 or the desktop interface 622 was in the previous foreground 628 from the information on the previous foreground 628. If the information indicates that the desktop interface 622 was in the previous foreground 628, the context evaluator 525 may determine that the desktop interface 622 was in the previous foreground 628. In addition, the context evaluator 525 may refrain from defining any clip 644. With no clip 644 defined, the metadata writer 530 may also abstain from generating the metadata clip 662. The recording 630 of the session 602 may continue to be generated by the session recorder 515, without identification of the transition frame 632' corresponding to the transition 624 to define any of the clips 644.

In contrast, if the information indicates that the window 624 associated with one of the applications 604 was in the previous foreground 628, the context evaluator 525 may identify the last frame 632" to define the end of the prior clip 644'. The prior clip 644' may be of the user using the application 604 corresponding to the window 624 previously in the foreground 628, prior to the transition 642 to another application 604. For example, the prior clip 644' may correspond to the user using a first application 604A via the first window 624A. In contrast, the next clip 644" may correspond to the user using a second application 604B via the second window 624B. The context evaluator 525 may also determine that the transition 642 is from one application 604 to another application 604 in the session 602. The prior clip 644' before the transition 642 may be for one application 604 (e.g., the first application 604A associated with the first window 624A), and the next clip 644" with the transition 624 may be for another application 604 (e.g., the second application 604B associated with the second window 624B).

In addition, the metadata writer 530 may generate the metadata 662 for the prior clip 644'. The generation of the metadata 662 may be similar as discussed above. In generating, the metadata writer 530 may create a clip identifier for the prior clip 644'. The clip identifier generated by the metadata writer 530 may be based on a number of clips 644 created from the recording 630. For example, the metadata writer 530 may maintain a counter to generate the clip identifier for the prior clip 644'. The metadata writer 530 may access the session 602 to identify the application 604 corresponding to the window 624 in the foreground 628 prior to the transition 642. With the identification, the metadata writer 530 may identify the process identifier and the application name for the application 604. The metadata writer 530 may identify the frame identifier for the previous transition frame 632' as the start of the prior clip 644'. The metadata writer 530 may further identify the frame identifier for the last frame 644 as the end of the prior clip 644'. With the identification, the metadata writer 530 may generate the metadata 662 and store the generated metadata 662 on the database 540.

Figure 6E:
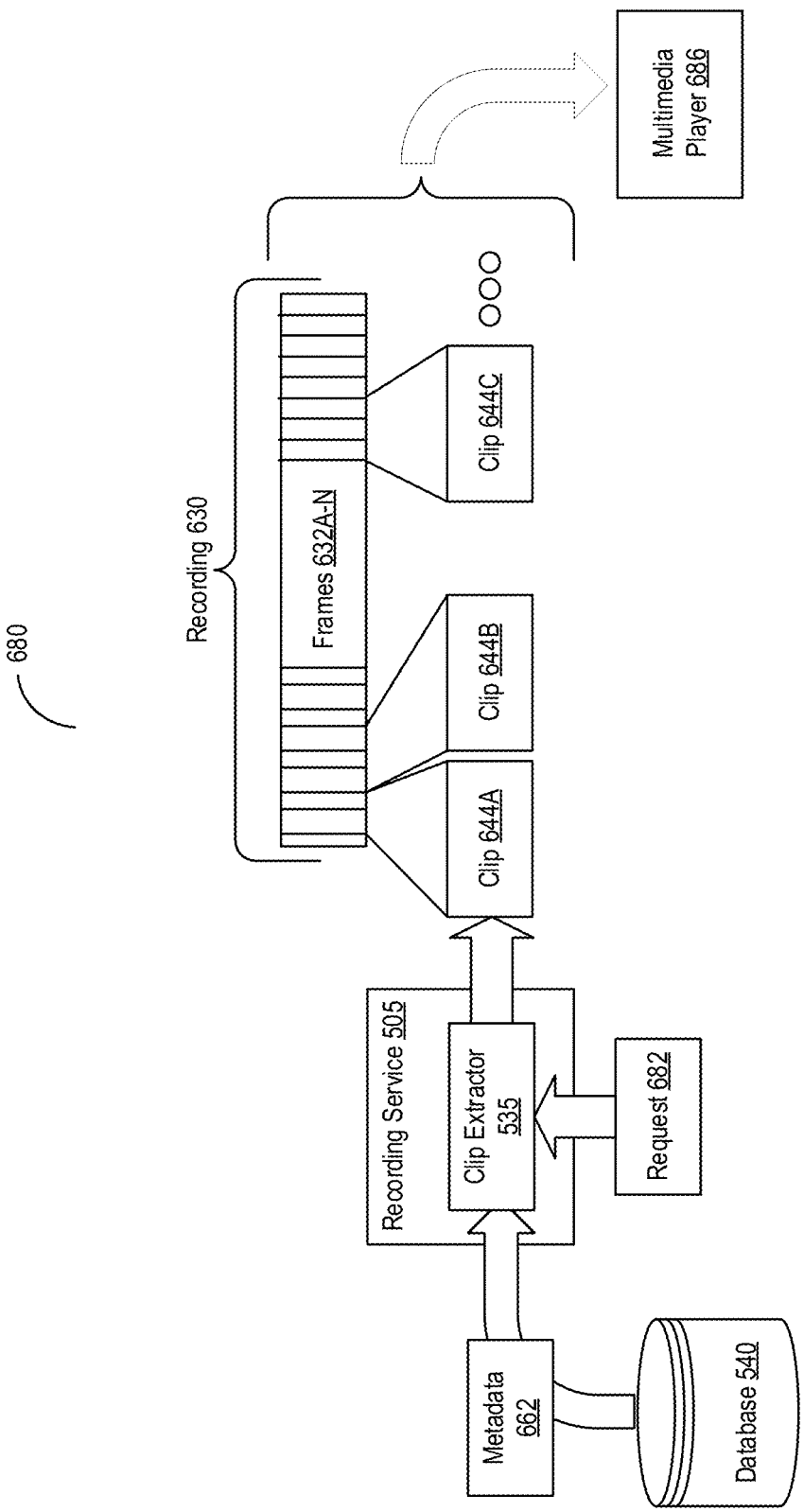
FIG. 6E is a block diagram of an embodiment of a process for extracting clips in the system for defining clips, in accordance with an illustrative embodiment.

Referring now to FIG. 6E, depicted is a block diagram of a process 680 for extracting clips in the system for defining clips. The process 680 may correspond to or include operations performed in the system 500 to generating clips from the recording using the metadata in accordance with requests. Under the process 680, the clip extractor 535 executing on the recording service 505 may create, produce, or otherwise generate one or more clips 644 from the recording 630 using the definitions of the metadata 662. To generate, the clip extractor 535 may access the database 540 to retrieve or identify the metadata 662 for each clip 644. With the identification of the metadata 662, the clip extractor 535 may identify the frame identifier for the start of a corresponding clip 644 and the frame identifier for the end of the clip 644.

From the recording 630, the clip extractor 535 may find, select, or otherwise identify the frame 632 corresponding to the start of the clip 644 as identified by the frame identifier. The clip extractor 535 may also identify the frame 632 corresponding to the end of the clip 644 as identified by the frame identifier. The clip extractor 535 may identify a subset of frames 632 from the recording 630 between the starting and the ending frames. The subset may include frames 632 between the start and end of the clip 644, inclusive. With the identification, the clip extractor 535 may generate the clip 644 to include the subset of frames 632. The clip extractor 535 may repeat this process for each clip 644 as defined by the metadata 662 to generate from the recording 630.

In some embodiments, the clip extractor 535 may use a request 682 in generating the clips 644 from the recording 630. The request 682 may be to generate clips 644 from the recording 630. The request 682 may be received from a user of the recording service 505 or a computing device associated with the administrator of the appliance 200, the servers 106, the networks 104 or 104', or the overall system 500, among others. The request 682 may include or identify at least one filter for the generation of clips 644. The filter of the request 682 may identify one or more applications 604 in the session 602 for which the clips 644 are to be generated. In some embodiments, the filter included in the request 682 may identify a group of applications 604 for which the clips 644 are to be generated. For instance, the request 682 may identify that clips 644 depicting the user using document processing applications in the session 602 are to be generated. The filter defined by the request 682 may include other specifications for the generation of the clips 644, such as minimum time length for the clip 644 or a range of dates and times for the user using the session 602, among others.

In accordance with the request 682, the clip extractor 535 may select or identify at a subset of the metadata 662. The clip extractor 535 may traverse through the metadata 662 maintained on the database 540. For each metadata 662, the clip extractor 535 may compare the specifications of the request 682 with the contents of the metadata 662. When the metadata 662 satisfies the specifications of the request 682, the clip extractor 535 may select the metadata 662 to generate a corresponding clip 644. For example, the clip extractor 535 may select the metadata 662 including the application name matching the application name specified in the request 682. The generation of the clip 644 may be similar as detailed above. On the other hand, the clip extractor 535 may ignore the metadata 662, and may continue traversal of the metadata 662 stored on the database 540.

Upon generation of the clips 644, the clip extractor 535 may send, convey, or otherwise provide the clips 644 to a multimedia player 686 for playback. The multimedia player 686 may be on the recording service 505, the client 102, or the computing device associated with the system administrator. Upon command, the multimedia player 686 may playback the clips 644 generated from the recording 630. In some embodiments, the clip extractor 535 may provide the recording 630 and the definitions of the clips 644 to the multimedia player 686. The multimedia player 686 may present or display an indication of the clips 644 within the recording 630 using the definitions. Upon command, the multimedia player 686 may playback the overall recording 630 or the individual clips 644.

Figure 7:
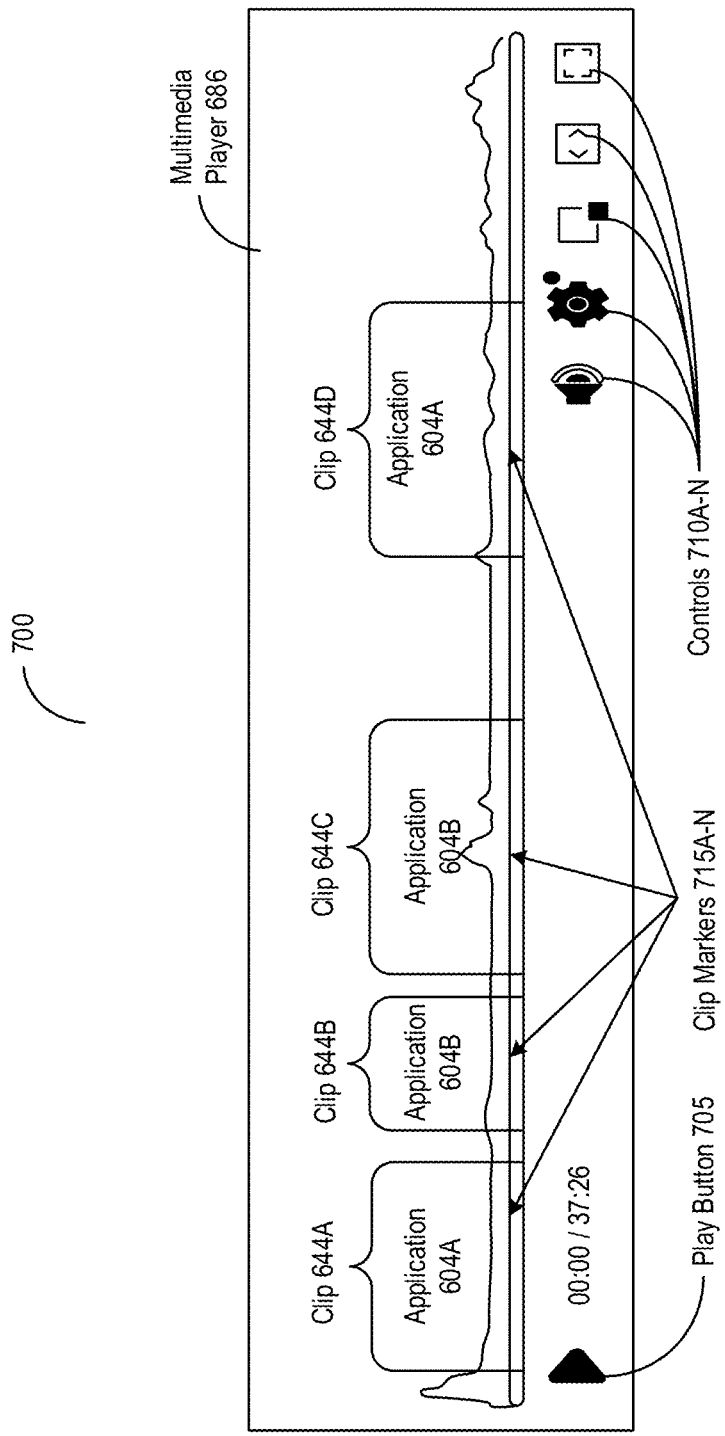
FIG. 7 is a block diagram of an embodiment of a multimedia player in the system for defining clips, in accordance with an illustrative embodiment.

Referring now to FIG. 7, depicted is a block diagram of a multimedia player interface 700 in the system for defining clips. As depicted, the multimedia player interface 700 may be the graphical user interface (GUI) for the multimedia player 686. The multimedia player interface 700 may include at least one player button 705 to start or stop playback of the recording 630. The multimedia player interface 700 may include one or more controls 710A-N (hereinafter generally referred to as controls 710) to control various aspects of the playback. Upon detecting user interaction with the play button 705, the multimedia player 686 may initiate playback of the recording 630 (or clip 644) from the indicated temporal location therein.

In addition, the multimedia player interface 700 may include one or more clip markers 715A-N (hereinafter generally referred to as clip markers 715) for the corresponding clips 644. Each clip marker 715 may identify or indicate a temporal location of the corresponding clip 644 within the recording 630. For example, as depicted, the individual clip markers 715 may show the temporal boundaries for the start and the end of the clip 644 in the recording 630. The clip marker 715 may also identify or indicate the application 604 used in the corresponding clip 644. For example, the first clip marker 715A and the fourth clip marker 715D may identify that the first application 604A is depicted in the corresponding clips 644A and 664B. The second clip marker 715B and the third clip marker 715C may identify that the second application 604B is depicted in the corresponding clips 644B and 664C.

In this manner, the clips 644 may be automatically generated from the recording 630, with each clip 644 corresponding to uses of various applications 604 in the session 602. The automated generation may eliminate a user from having to manually scroll (e.g., in the multimedia player 686) through the recording 630 to identify usage of applications 604 during the session. The recording service 505 may therefore improve the human-computer interactions (HCI) between the user and recording 630 and reduce the consumption of computing resources from the meticulous and manual scrolling through the recording 630. Furthermore, with the ability to more quickly identify clips 644 within the recording 630 of the session 602 a system administrator for the session 602 to more easily conduct security, diagnosis, and other administrative tasks.

Figure 8:
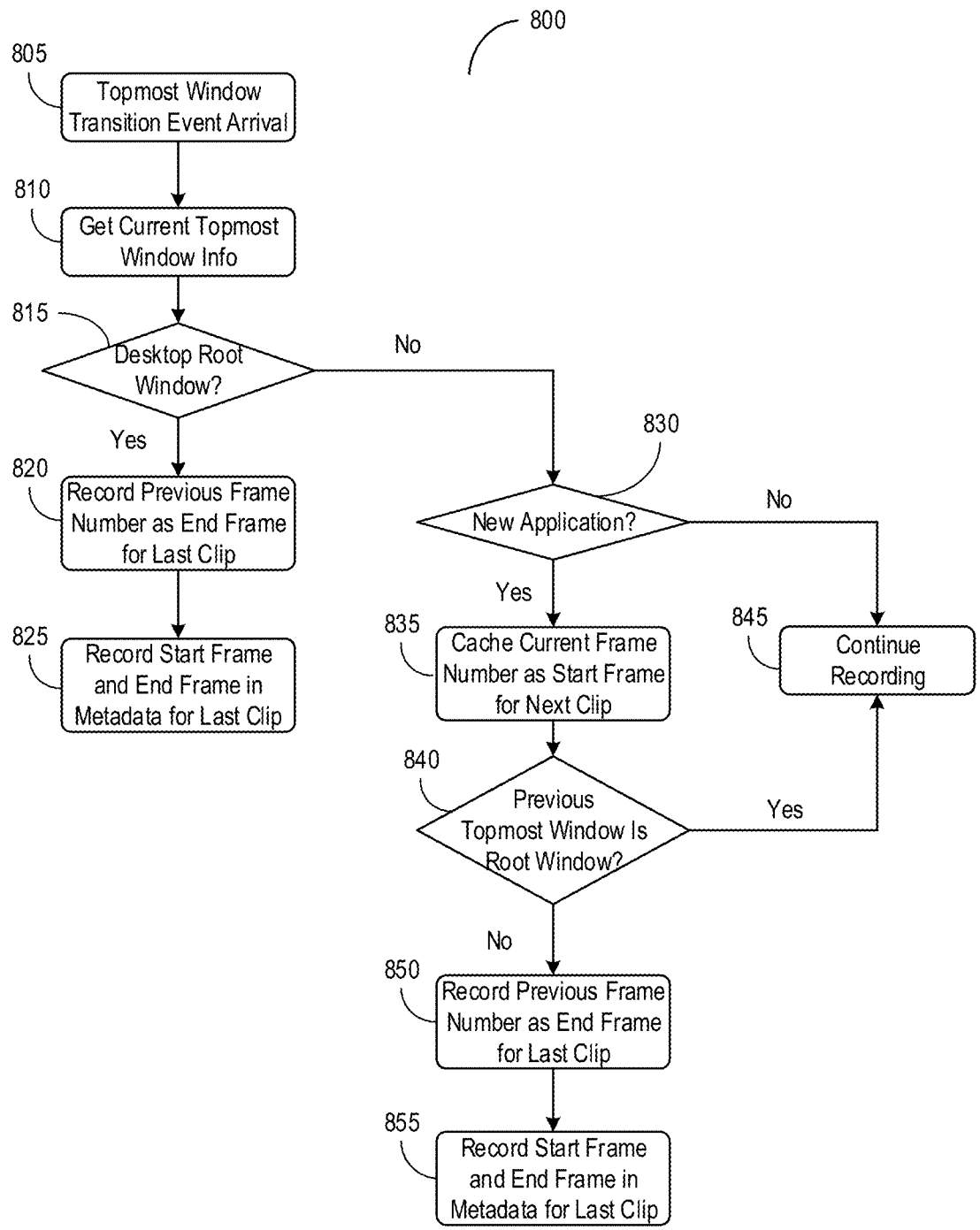
FIG. 8 is a flow diagram of an embodiment of a method of writing metadata in response to detecting transitions while recording, in accordance with an illustrative embodiment.

Referring now to FIG. 8, depicted is a flow diagram of a method 800 of writing metadata in response to detecting transitions while recording. The method 800 may be implemented using, or performed by, the components described in FIGS. 1-6E, such as the recording service 505. Under the method 800, a service may detect an arrival of a topmost window transition event (805). The service may obtain a current topmost window information (810). The service may determine whether the current topmost window is a desktop root window (815). If the current top most window is the desktop root window, the service may record a previous frame number as an end frame of a last clip (820). The service may also record a start frame and end frame in metadata for the last clip (825).

On the other hand, if the current topmost window is not the desktop root window, the service may determine whether the current topmost window is for a new application (830). If the current topmost window is for the new application, the service may cache a current frame number as a start frame for a next clip (835). The service may also determine whether the previous topmost window is the desktop root window (840). When the previous topmost window is the desktop root window or when the current topmost window is not for the new application, the service may continue to record (845). Otherwise, when the previous topmost window is not the desktop root window, the service may record the previous frame number as the end frame for the last clip (850). The service may also record a start frame and an end frame in the metadata for the last clip (855).

Figure 9:
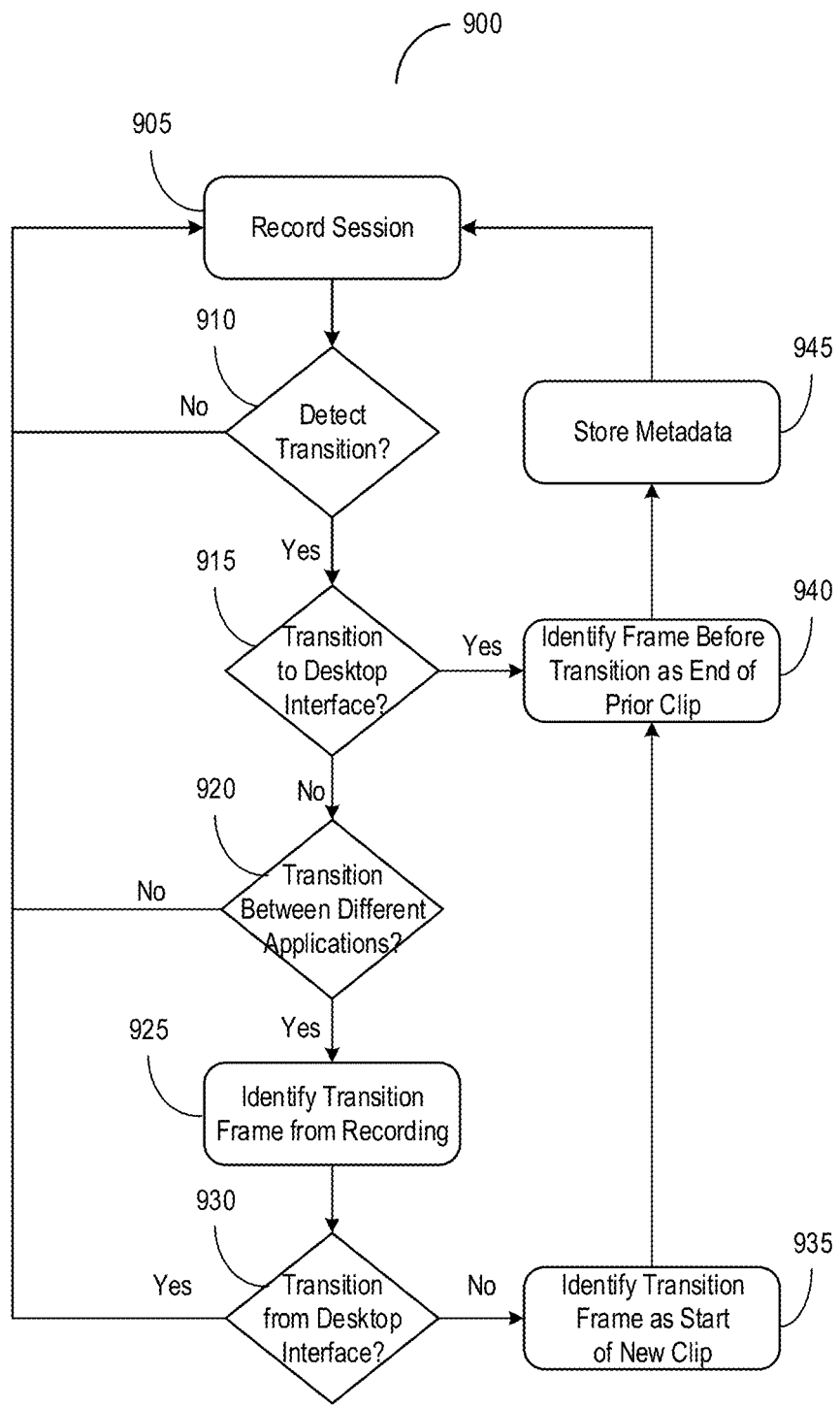
FIG. 9 is a flow diagram of an embodiment of a method of defining clips of application use within a recording of a session, in accordance with an illustrative embodiment.

Referring now to FIG. 9, depicted is a flow diagram of an embodiment of a method 900 of defining clips of application use within a recording of a session. The method 800 may be implemented using, or performed by, the components described in FIGS. 1-6E, such as the recording service 505. Under the method 900, a service (e.g., the recording service 505) may record a session (e.g., the session 602) (905). The service may detect whether a transition (e.g., the transition 642) occurred (910). Otherwise, when the transition is detected, the service may determine whether the transition is to a desktop interface (e.g., the desktop interface 622) (915). If the transition is not to the desktop interface, the service may determine whether the transition is between different applications (e.g., the applications 604) (920). If the transition is between different applications, the service may identify a transition frame (e.g., the transition frame 632') from the recording (e.g., the recording 630) (925). The service may determine whether the transition is from the desktop interface (930). If no transition is not from the desktop interface, the transition is not between different applications, or no transition is detected, the service may continue to record. Otherwise, if the transition is from the desktop interface, the service may identify the transition frame as a start of a new clip (e.g., the clip 644) (935). If the transition is from or to the desktop interface, the service may further identify the frame before the transition as an end of the prior clip (940). The service may store metadata (e.g., the metadata 662) (945).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method of defining a clip within a recording, comprising:
    generating, by a device, a recording of a session of a user via which a plurality of applications is accessible;
    detecting, by the device, a transition of an application of the plurality of applications in a foreground of the session;
    identifying, by the device, from the recording, a frame corresponding to the transition in the foreground;
    storing, by the device, an identification of the frame corresponding to the transition to define a clip of the user within the recording using the application in the session; and
    determining, by the device responsive to detecting, that the transition is to a desktop interface in the foreground of the session,
    wherein identifying the frame further comprises identifying the frame to define an end of the clip of the user using the application, responsive to determining that the transition is to the desktop interface.

2. A method of defining a clip within a recording, comprising:
    generating, by a device, a recording of a session of a user via which a plurality of applications is accessible;
    detecting, by the device, a transition of an application of the plurality of applications in a foreground of the session;
    identifying, by the device, from the recording, a frame corresponding to the transition in the foreground;
    storing, by the device, an identification of the frame corresponding to the transition to define a clip of the user within the recording using the application in the session; and
    determining, by the device responsive to determining that the application is different from a second application previously in the foreground, that a desktop interface was not previously in the foreground,
    wherein identifying further comprises identifying a second frame prior to the transition to define an end to a second clip of the user using the second application, responsive to determining that the desktop interface was not previously in the foreground.

3. A method of defining a clip within a recording, comprising:
    generating, by a device, a recording of a session of a user via which a plurality of applications is accessible;
    detecting, by the device, a transition of an application of the plurality of applications in a foreground of the session;
    identifying, by the device, from the recording, a frame corresponding to the transition in the foreground;
    storing, by the device, an identification of the frame corresponding to the transition to define a clip of the user within the recording using the application in the session;
    determining, by the device responsive to determining that a second transition between a first window and a second window in the foreground, that the first window and the second window are associated with the application; and
    continuing, by the device responsive to determining that the first window and the second window are associated with the application, generating the recording of the session, without identification of a second frame corresponding to the second transition.

4. The method of claim 1, wherein generating further comprises generating the recording of the session hosted on a virtual machine to provide the user on a client access to the plurality of applications via the session.

5. The method of claim 1, wherein detecting further comprises monitoring for the transition in the foreground of the session, concurrent to the generation of the recording of the session of the user accessing one or more of the plurality of applications.

6. The method of claim 1, wherein storing further comprises generating, for the recording, metadata identifying: (i) an identifier of the clip, (ii) an identifier associated with the application, and (iii) an identifier referencing the frame in the recording.

7. The method of claim 1, further comprising generating, by the device, from the recording, the clip of the user using the application in the session in accordance with the frame, in response to a request.

8. A system for defining a clip within a recording, comprising:
   a device having one or more processors coupled with memory, configured to:
      generate a recording of a session of a user via which a plurality of applications is accessible;
      detect a transition of an application of the plurality of applications in a foreground of the session;
      identify, from the recording, a frame corresponding to the transition in the foreground;
      store an identification of the frame corresponding to the transition to define a clip of the user within the recording using the application in the session;
      determine, responsive to detecting, that the transition is to a desktop interface in the foreground of the session; and
      identify the frame to define an end of the clip of the user using the application, responsive to determining that the transition is to the desktop interface.

9. A system for defining a clip within a recording, comprising:
   a device having one or more processors coupled with memory, configured to:
      generate a recording of a session of a user via which a plurality of applications is accessible;
      detect a transition of an application of the plurality of applications in a foreground of the session;
      identify, from the recording, a frame corresponding to the transition in the foreground;
      store an identification of the frame corresponding to the transition to define a clip of the user within the recording using the application in the session;
      determine, responsive to determining that the application is different from a second application previously in the foreground, that a desktop interface was not previously in the foreground; and
      identify a second frame prior to the transition to define an end to a second clip of the user using the second application, responsive to determining that the desktop interface was not previously in the foreground.

10. A system for defining a clip within a recording, comprising:
    a device having one or more processors coupled with memory, configured to:
       generate a recording of a session of a user via which a plurality of applications is accessible;
       detect a transition of an application of the plurality of applications in a foreground of the session;
       identify, from the recording, a frame corresponding to the transition in the foreground;
    store an identification of the frame corresponding to the transition to define a clip of the user within the recording using the application in the session;
    determine, responsive to determining that a second transition between a first window and a second window in the foreground, that the first window and the second window are associated with the application; and
    continue, responsive to determining that the first window and the second window are associated with the application, generating the recording of the session, without identification of a second frame corresponding to the second transition.

11. The system of claim 8, wherein the device is further configured to generate, from the recording, the clip of the user using the application in the session in accordance with the frame, in response to a request.

* * * * *